(12) United States Patent
Emadi et al.

(10) Patent No.: US 12,313,770 B2
(45) Date of Patent: May 27, 2025

(54) SYSTEM AND METHOD FOR RADAR CALIBRATION

(71) Applicant: Zadar Labs, Inc., Santa Clara, CA (US)

(72) Inventors: Mohammad Emadi, Santa Clara, CA (US); Ali Mostajeran, Santa Clara, CA (US); Navid Fattahi, Santa Clara, CA (US); Vitalii Topolnytskyi, Santa Clara, CA (US)

(73) Assignee: Zadar Labs, Inc., Santa Clara, CA (US)

( * ) Notice: Subject to any disclaimer, the term of this patent is extended or adjusted under 35 U.S.C. 154(b) by 373 days.

(21) Appl. No.: 17/961,140

(22) Filed: Oct. 6, 2022

(65) Prior Publication Data

US 2024/0111021 A1    Apr. 4, 2024

Related U.S. Application Data

(63) Continuation-in-part of application No. 17/957,426, filed on Sep. 30, 2022.

(51) Int. Cl.
    *G01S 7/40*          (2006.01)
    *G01S 13/931*       (2020.01)

(52) U.S. Cl.
    CPC .......... *G01S 7/4034* (2021.05); *G01S 7/4052* (2013.01); *G01S 13/931* (2013.01)

(58) Field of Classification Search
    CPC ........ G01S 13/931; G01S 13/52–13/56; G01S 7/40; G01S 7/4026; G01S 7/403; G01S 7/4034; G01S 7/4052; G01S 7/415
    See application file for complete search history.

(56) References Cited

U.S. PATENT DOCUMENTS

| | | | | |
|---|---|---|---|---|
| 10,796,453 | B1* | 10/2020 | Yan | B60R 11/04 |
| 2015/0369912 | A1* | 12/2015 | Kishigami | G01S 13/34 |
| | | | | 342/104 |
| 2017/0299711 | A1* | 10/2017 | Kishigami | G01S 13/5242 |
| 2018/0180731 | A1* | 6/2018 | Inoue | G01S 15/931 |
| 2018/0364330 | A1* | 12/2018 | Klotzbuecher | G01S 13/42 |
| 2020/0386883 | A1* | 12/2020 | Hofmann | G01S 13/584 |
| 2022/0137227 | A1* | 5/2022 | Armstrong-Crews | |
| | | | | B60W 30/0956 |
| | | | | 701/26 |
| 2022/0179060 | A1* | 6/2022 | Hakobyan | G01S 13/72 |

(Continued)

*Primary Examiner* — Peter M Bythrow
(74) *Attorney, Agent, or Firm* — Novo TechIP International PLLC

(57) ABSTRACT

A system and method to receive radar returns from objects in response to a first radar scan, wherein the radar returns include Doppler shift, run a segmentation algorithm multiple times on the received radar returns, using a different preset estimated radar yaw angle for each iteration, wherein the estimated radar yaw angles are for estimated directions of transmission of the radar signals along a radar boresight from the transmitter of the radar system relative to a predetermined direction for each run of the segmentation algorithm, to determine which of the objects are static objects using the segmentation algorithm, and determine a first calibrated radar yaw angle as one of the preset estimated radar yaw angles which, among the different preset estimated radar yaw angles, has a highest number of adjusted radar returns for objects determined to be static objects by the segmentation algorithm.

22 Claims, 8 Drawing Sheets

(56) References Cited

U.S. PATENT DOCUMENTS

| | | | |
|---|---|---|---|
| 2023/0003871 A1* | 1/2023 | Qian | G06N 20/00 |
| 2023/0161026 A1* | 5/2023 | Grebner | G01S 7/354 |
| | | | 342/113 |
| 2023/0280446 A1* | 9/2023 | Ren | G01S 13/4454 |
| | | | 342/202 |
| 2024/0255612 A1* | 8/2024 | Akamine | G01S 7/415 |
| 2024/0264294 A1* | 8/2024 | Kreidler | B60W 40/02 |
| 2024/0329237 A1* | 10/2024 | Hayashi | G01S 13/86 |

* cited by examiner

SYSTEM AND METHOD FOR RADAR CALIBRATION

CROSS-REFERENCE TO RELATED APPLICATION

The present application is a continuation-in-part application of application Ser. No. 17/957,426, entitled "System and Method for Radar Static-Dynamic Segmentation," filed on Sep. 30, 2022, the entire contents of which is hereby incorporated by reference.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may be installed with a radar unit, along with other sensors such as an inertial measurement unit (IMU), which provides measurement data of objects in the environment that the vehicle is situated in, such that the vehicle can make or assist a human driver to make a navigation decision.

Such measurements are affected by the position of the radar unit, e.g., the radar yaw angle between the boresight of the radar unit, along which radar signals are transmitted, and a predetermined reference direction. This reference direction can be a coordinate used for making measurement by an IMU. Such IMUs are often placed adjacent to the radar sensor on top of a vehicle. Proper alignment of the radar boresight with a coordinate of the IMU, used by the IMU for taking measurements, can ensure proper coordination between data obtained by the radar and data obtained by the IMU. Alternatively, this reference direction can be a direction of movement of a vehicle, which may or may not be in alignment with the coordinate of the IMU and/or the radar boresight. In any event, this radar yaw angle needs to be accurately calibrated to provide accurate radar sensing and measurement.

Traditionally, this radar calibration of the radar yaw angle is performed offline at specific calibration locations such as at the factory, which can often be inconvenient and may not satisfy calibration requests on demand. Some other techniques such as a technique known as "Blind Online Calibrations" have been proposed to allow calibration on the vehicle without needing to provide the calibration at the factory. An example of this technique is described in U.S. Published Application 2021/0199759, entitled "Systems and Methods for Blind Online Calibration of Radar Systems on a Vehicle." However, these previous blind online calibration arrangements need a large number of scans and predefined non-moving targets in the environment which the radar is situated in during the calibration.

As is well known, radar is capable of detecting the speed of objects by measuring Doppler velocity of the objects. Doppler velocity is radial velocity of an object, or in simple terms, an object's speed toward or away from the radar system that transmitted a radar signal toward the object. When both a radar system and an object are static (i.e., not moving) then measured Doppler velocity for the object will be equal to 0 (zero). For moving objects, on the other hand, a static radar system will measure positive or negative Doppler which is equal to the radial velocity of those objects relative to the static radar system. Separating objects as being static (not moving) and dynamic (moving) is called static-dynamic segmentation. Such separation is very useful and crucial for multiple radar applications, for example, for autonomous vehicles, surveillance, and traffic monitoring, to name just a few.

For example, some benefits of segmenting between static objects and dynamic moving objects include separating real threats (e.g., moving objects) from benign threats (e.g., non-moving objects), use in camera systems, and situations where it is necessary to have several frames to start tracking and predicting the next movements of an object. In short, being able to quickly determine velocity of moving targets is extremely useful for achieving faster and more accurate tracking. This can result in better planning (i.e., decision making), and can reduce the computational burden of any AI/ML algorithms, for example, for camera systems, by only focusing on dynamic objects.

Although determining object movement, and segmenting static objects from dynamic objects, works well when the radar system itself is static, this is not the case when the radar system is moving. The situation of a moving radar system frequently occurs, for example, with radar systems mounted on moving vehicles, such a self-driving cars, or on robots. In particular, when the radar system itself is moving, even static objects will have non-zero doppler and will appear to be moving. Therefore, it is impossible to separate static and dynamic objects by just checking if doppler velocity is 0. This is becoming an increasingly large problem for autonomous systems because knowing if an object is moving or not is one of main characteristics of any detected surrounding entities, such as another car or a pedestrian.

Accordingly, it is an object of the present disclosure to provide improved static-dynamic segmentation in situations where a radar system is moving relative to surrounding static objects, and to use this segmentation to calibrate the radar yaw angle of the radar system while the radar system is mounted on a moving platform. It is a further object of the present disclosure to provide such calibration of the radar yaw angle using only radar data, and using as little as only one scan (or frame) of radar signals from the radar system.

SUMMARY

In an implementation, a system is provided including one or more processors and one or more machine-readable media storing instructions which, when executed by the one or more processors, cause the one or more processors to receive radar returns from objects in response to a first radar scan comprised of a plurality of transmitted radar signals from the radar system, wherein the radar returns include Doppler shift, run a segmentation algorithm a plurality of times on the received radar returns from the first radar scan, using a different preset estimated radar yaw angle for each iteration of running of the segmentation algorithm, from a group of preset estimated radar yaw angles, wherein the estimated radar yaw angles are for estimated directions of transmission of the radar signals along a radar boresight from the transmitter of the radar system relative to a predetermined direction for each run of the segmentation algorithm, to determine which of the objects are static objects using the segmentation algorithm, and determine a first calibrated radar yaw angle as one of the preset estimated radar yaw angles which, among the different preset estimated radar yaw angles, has a highest number of adjusted radar returns for objects determined to be static objects by the segmentation algorithm.

In another implementation, a method is provided receiving radar returns from objects in response to a first radar scan comprised of a plurality of transmitted radar signals from a radar system including a transmitter and a receiver mounted on a moving platform, wherein the radar returns include Doppler shift, running a segmentation algorithm a plurality of times on the received radar returns from the first radar scan, using a different preset estimated radar yaw angle for each iteration of running of the segmentation algorithm, from a group of preset estimated radar yaw angles, wherein the estimated radar yaw angles are for estimated directions of transmission of the radar signals along a radar boresight from the transmitter of the radar system relative to a predetermined direction for each run of the segmentation algorithm, to determine which of the objects are static objects using the segmentation algorithm, and determining a first calibrated radar yaw angle as one of the preset estimated radar yaw angles which, among the different preset estimated radar yaw angles, has a highest number of adjusted radar returns for objects determined to be static objects by the segmentation algorithm.

In another implementation, a system including one or more processors coupled to receive signals from a radar system including a transmitter and a receiver mounted on a moving platform and one or more machine-readable media storing instructions which, when executed by the one or more processors, cause the one or more processors to receive radar returns from objects in response to radar scans of transmitted radar signals from the radar system, wherein the radar returns include Doppler shift, adjust a velocity indicated in each of the radar returns based on an azimuth of each of the received radar returns to generate a set of adjusted radar returns, perform a first iteration of a segmentation algorithm using a first estimated radar yaw angle to group the adjusted radar returns into a plurality of groups based on the velocity indicated in each of the adjusted radar returns, each of the groups having predetermined minimum velocity value Vmin, a predetermined maximum velocity value Vmax, and a predetermined threshold velocity difference value between Vmin and Vmax, determine which of the objects are static objects based on determining which group of the plurality of groups has highest number of adjusted radar returns, repeat the segmentation algorithm a plurality of times on the received radar returns from the first radar scan, using a different preset estimated radar yaw angle for each iteration of running of the segmentation algorithm, from a group of preset estimated radar yaw angles, wherein the estimated radar yaw angles are for estimated directions of transmission of the radar signals along a radar boresight from the transmitter of the radar system relative to a predetermined direction for each run of the segmentation algorithm, to repeatedly determine which of the objects are static objects using the segmentation algorithm, and determine a first calibrated radar yaw angle as one of the preset estimated radar yaw angles which, among the different preset estimated radar yaw angles, has a highest number of adjusted radar returns for objects determined to be static objects by the segmentation algorithm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
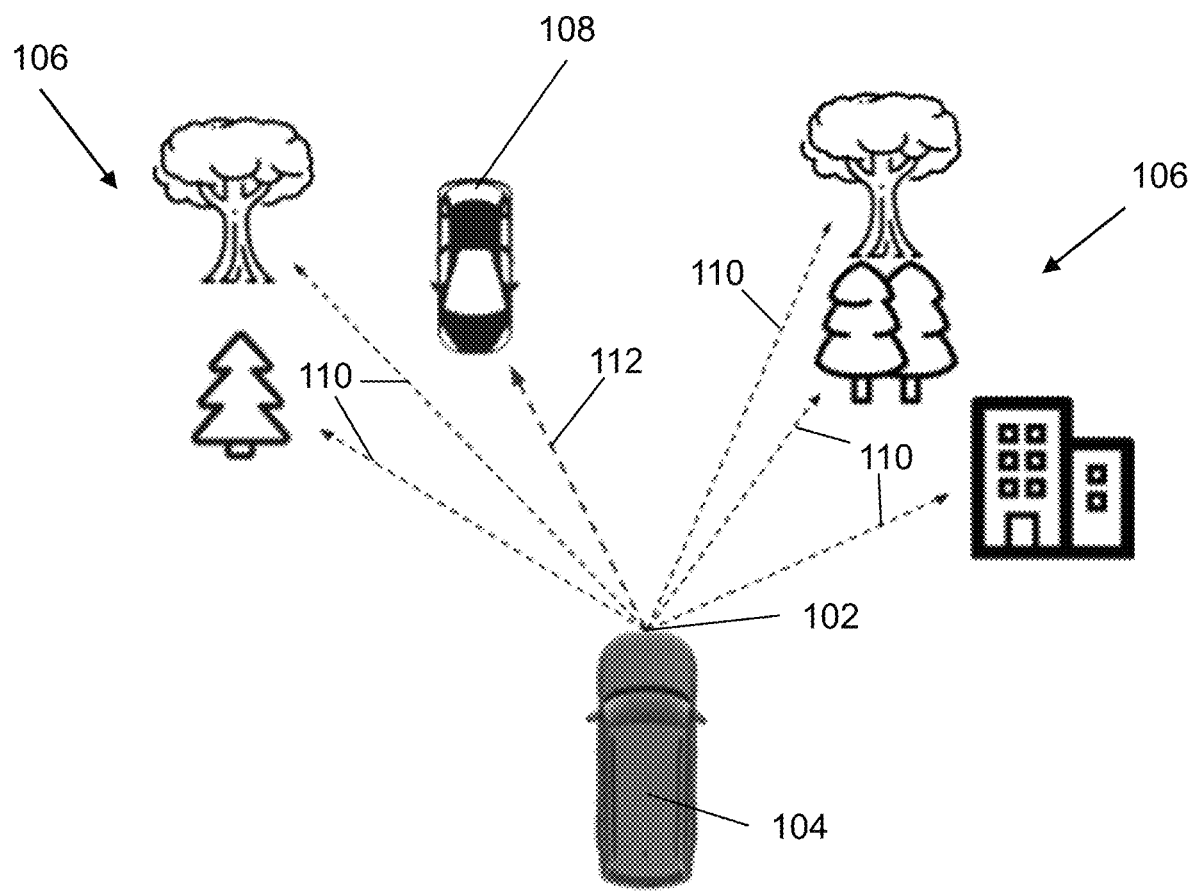
FIG. 1 illustrates an example of an environment in which the system and method of the present disclosure can be utilized.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to segmenting static objects and dynamic objects using a moving radar system based on knowing that the number of static points in the environment is higher than the number of dynamic points and using that information to separate static and dynamic points, and using this segmentation to calibrate the radar yaw angle of the radar system while the radar system is mounted on a moving platform.

More specifically, as described in the previously filed application Ser. No. 17/957,426 as well as in the following discussion, a segmentation algorithm is used to make an initial determination from radar returns containing Doppler shift as to which objects are static. In accordance with implementations of the present disclosure, this initial determination is performed using a first estimate of what the radar yaw angle is for the radar system relative to a predetermined reference line, such as alignment of the radar boresight with an adjacent IMU or a direction of movement of the moving platform. The determination of which objects are static objects using the segmentation algorithm is then repeated multiple times, with a different estimated radar yaw angle each time, so that a set of static object determinations is obtained. In accordance with implementations of the present disclosure, the set with the highest number of points indicating which objects are static corresponds to the correct radar yaw angle, thus calibrating the radar yaw angle of the radar system.

With regard to the above-described operations, as described below with regard to FIGS. 3-6, a segmentation algorithm calculates expected doppler for each radar point based on the point azimuth angle relative to the movement direction of the moving platform the radar is mounted on. Then points with the same expected doppler are grouped together. The azimuth angle used in the calculation is the sum of the point azimuth angle in the radar coordinate system (relative to the radar boresight of the transmitted signals) and the radar yaw angle (e.g., the angle between the radar boresight and a reference direction, such as the direction of movement of the moving platform). Therefore, if the correct radar yaw angle is known then it is possible to find all static points by selecting the group with the maximum number of points.

On the other hand, if the radar yaw angle is not measured properly, then all calculations based on it will produce essentially random results and there will be no distinguished point group with a significantly larger number of points that represent static objects. In accordance with aspects of the present disclosure, in order to properly calibrate the radar yaw angle to avoid the above-mentioned problem, the segmentation algorithm is run multiple times using a different estimated radar yaw angle, from among a number of different possible radar yaw angles, for each run of the segmentation algorithm. The estimated radar yaw angle, from the group of different estimated radar yaw angles, that produces a group of radar returns with the maximum number of points indicating static objects is the correct calibrated radar yaw angle. That group of points indicating static objects should have a maximum number of points compared to all other runs of the segmentation algorithm, thereby providing an indication of the correct calibrated radar yaw angle for the radar system.

In the following description, first a discussion of a segmentation operation to make a determination of which objects are static will be provided, with reference to FIGS. 3-6, for a first iteration of using a segmentation algorithm with an initial estimated radar yaw angle. Next, the repeated use of the segmentation algorithm, using different estimated radar yaw angles for each run, will be described with reference to FIG. 7 to describe the radar yaw angle calibration process in accordance with aspects of the present disclosure.

Referring to FIG. 1, an example is shown of an environment in which the system and method of the present disclosure can be utilized. As shown in FIG. 1, a radar system 102 is mounted on a moving platform 104, such as a moving vehicle, which is in motion relative to a plurality of surrounding static objects 106 and other moving objects 108. The radar system 102 includes a transmitter (not shown) which transmits a plurality of radar signals, including signals 110, which reflect off the surrounding static objects 106, and signals 112, which reflect off other moving objects 108. The radar system 102 also includes a receiver (not shown) to receive the reflected radar returns from the signals 110 and 112 and an on-board computer (not shown) for carrying out the signal processing of the radar returns in the manner discussed below with regard to FIGS. 3-6. Regarding this, the transmitted radar signals 110 and 112 are identical in the outbound direction but will be different in the return direction since the radar returns for the signals 110 will be reflected from static objects, whereas the radar signals 112 will be reflected from moving objects.

Figure 2:
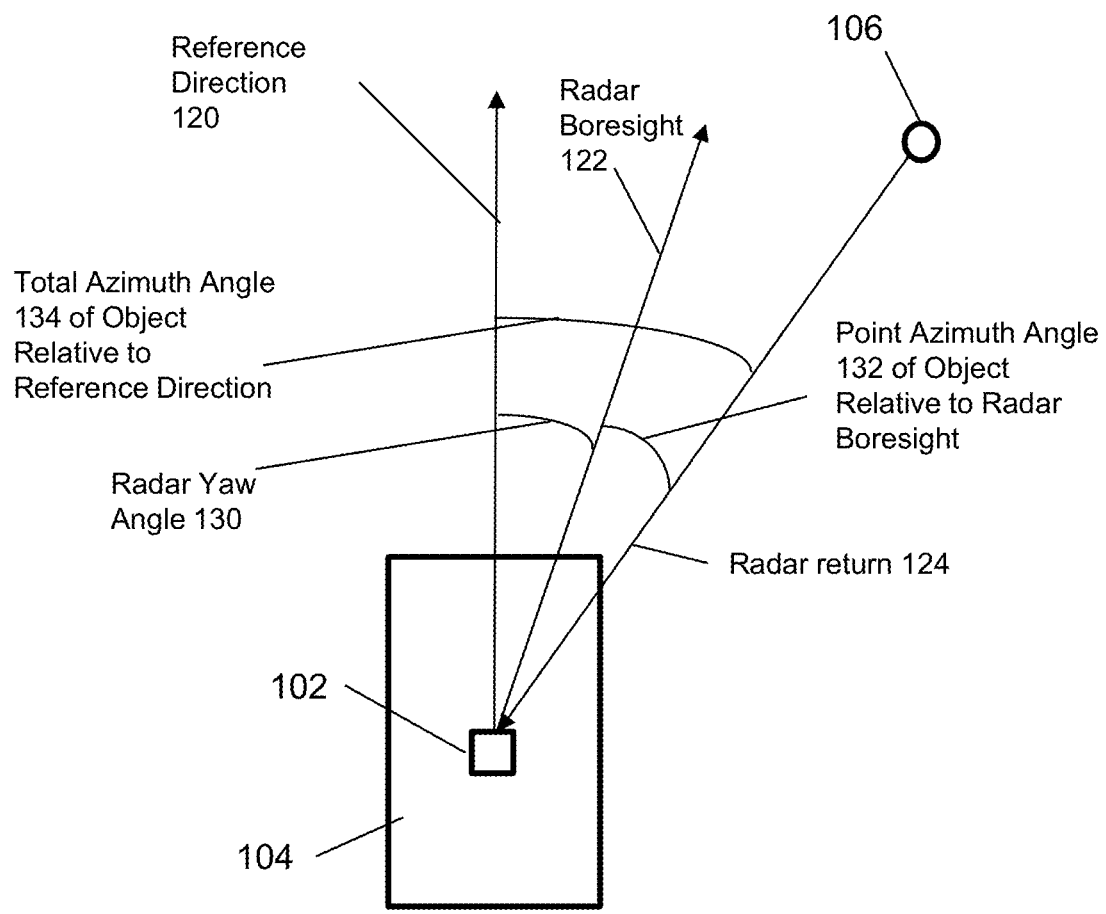
FIG. 2 illustrates an example of radar yaw angles and azimuth angles relating to the system an method of the present disclosure

Referring to FIG. 2, an example is shown of radar yaw angles and azimuth angles relating to the system and method of the present disclosure, particularly with regard to the calibration features of the present disclosure. In FIG. 2 the reference direction 120 (e.g., which, in this particular example of FIG. 2, can be the direction of movement of the moving platform 104) is the reference direction for measuring the radar yaw angle 130, relative to the radar boresight 122. The reference direction 120 is also the reference for measuring a total azimuth angle 134 of radar return 124 from the static object 106 relative to the reference direction 120. The point azimuth angle 132 is the angle of the radar return 124 from the object 106 relative to the radar boresight 122 (in response to a transmitted radar signal 110 such as shown in FIG. 1). As noted above, the total azimuth angle 134 used in the calculation using the segmentation algorithm to determine which objects are static objects 106 (as discussed herein with regard to FIGS. 2-7) is the sum of the point azimuth angle 132 in the radar coordinate system (relative to the radar boresight 122 of the transmitted signals) and the radar yaw angle 130 (e.g., the angle between the radar boresight 122 and the reference direction 120, such as the direction of movement of the moving platform 104 or a coordinate used for measurements by an IMU). It is noted that in the implementation of FIG. 2, the radar system 102 is shown mounted on top of the moving platform 104, which is often the case. However, in other implementations, the radar system 102 could be mounted in other locations, such as in the front or on one of the sides of the moving platform 104.

Figure 3:
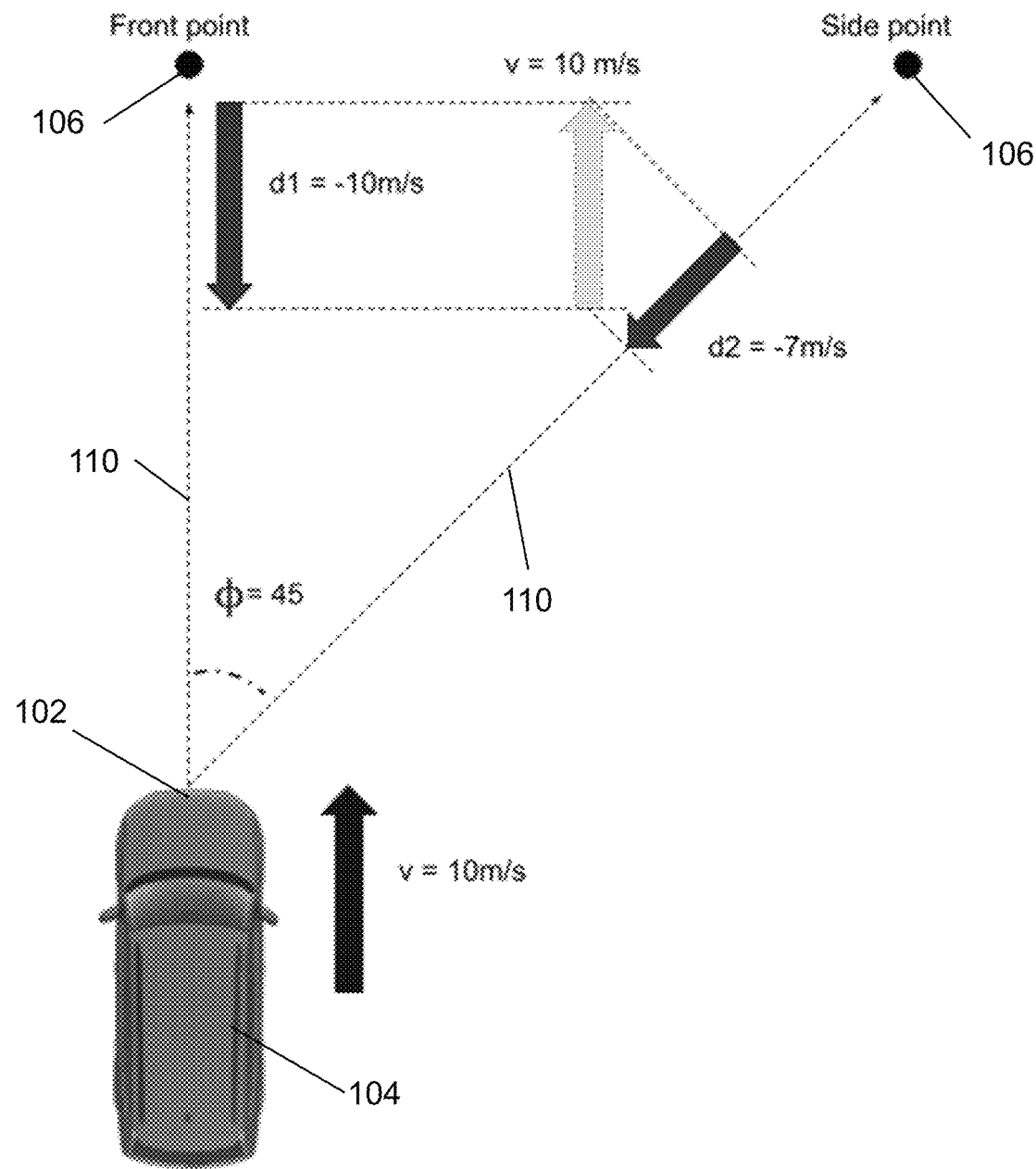
FIG. 3 shows differences in radar returns of static objects at a radar system mounted on a moving platform based on an azimuth of the static objects relative to the moving radar system.

FIG. 3 shows differences in radar returns from static objects at a radar system 102 mounted on a moving platform 104 (e.g., a vehicle in this specific example) based on an azimuth of the static objects relative to the moving radar system, wherein the radar returns include Doppler shift. It is noted that, for the following discussion of FIG. 3, which is a simplified explanation for purposes of illustrating the differences in Doppler shift in a radar return based on the position of the object being detected, the reference to the azimuth of the static objects relative to the moving radar system is based on the assumption that the azimuth 4 is relative to the direction of travel of the vehicle, and that the radar boresight is the same as this direction of travel. In other words, for this first simplified explanation using FIG. 3, it is assumed that the correct radar yaw angle is 0°. Following this initial explanation, an example where the radar yaw angle is something greater than 0° will be discussed, together with a discussion of how to calibrate this radar yaw angle even when the platform is moving.

The issue illustrated in FIG. 3 regarding differences in Doppler shift depending on the location of the detected object relative to the radar boresight is that, if the moving platform 104 moves with v=10 m/s velocity and the radar system 102 mounted thereon is facing front, a static object 106 directly in front of the moving radar system 102 will have a Doppler velocity d1=−10 m/s but returns from another static object 106 that lays on the side with ϕ=45 degree azimuth relative to the moving radar system 102 will have a Doppler velocity of d2=−7 m/s. Both points are static objects 106, but as can be seen, they have different Doppler velocity values because of the differences in the angles of the static objects 106 relative to the moving radar system 102.

More specifically, still referring to FIG. 3, the Doppler velocity values for these two illustrated static points have different values because radial velocity is calculated as: Radial Velocity=Car Speed×cos(ϕ), where ϕ is azimuth angle for the point. Next, car speed (e.g., the speed of the moving platform 104, which, from this point on will be assumed to be a car, although it is to be understood that this is solely for purposes of example, and any other moving platform could be used) can be calculated as: Car Speed=Radial Velocity÷cos(ϕ). It is common to represent approaching points with negative Doppler. Given that, and replacing radial velocity with Doppler velocity, one can determine a final equation that is true for each and every static point when car is moving as: Adjusted Car Speed=−Doppler÷cos(ϕ).

Figure 5:
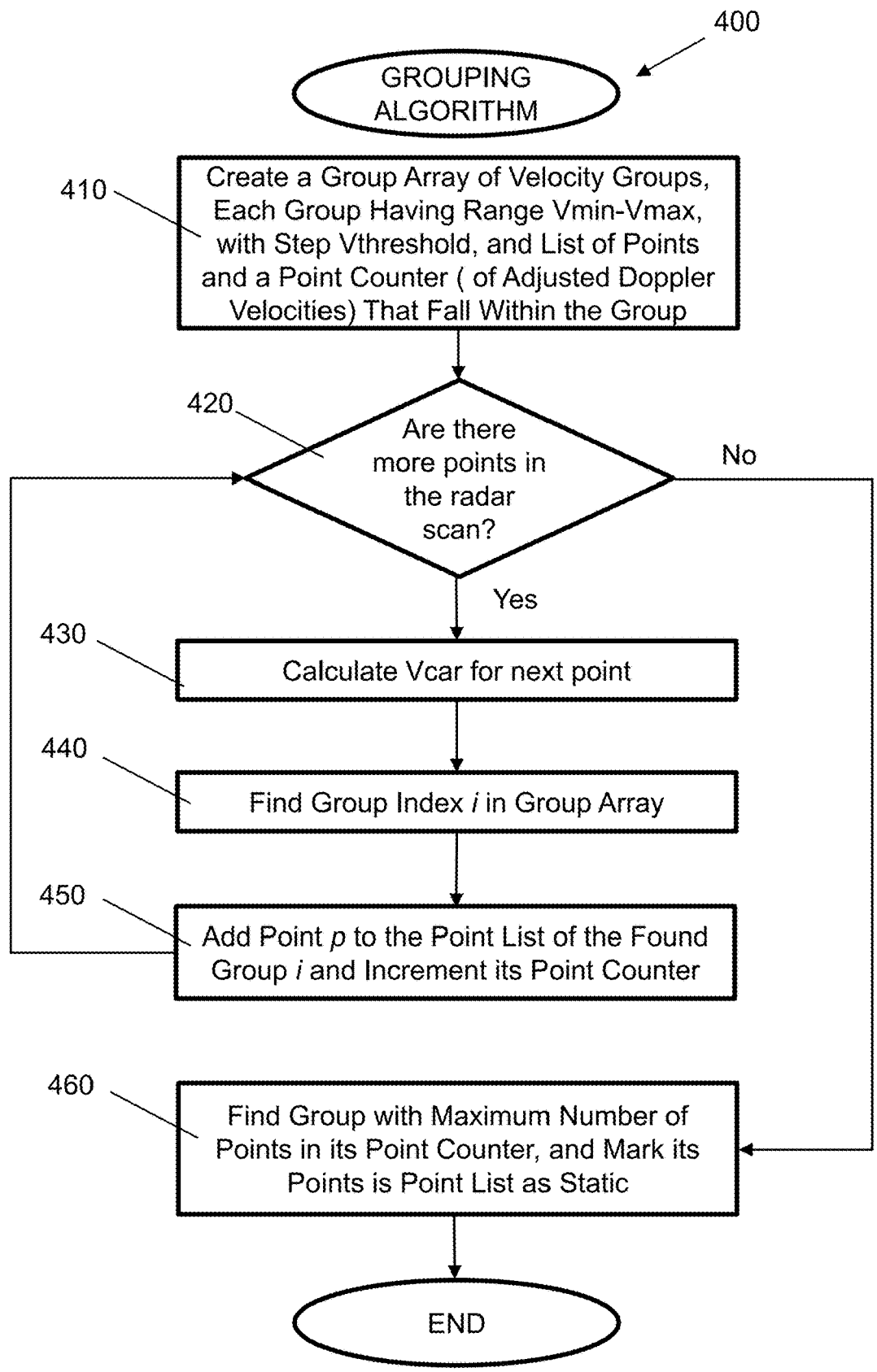
FIG. 5 is a flow diagram showing operations for a grouping algorithm, in accordance with the aspects of the present disclosure.

It is noted that although the example in FIG. 3 only shows static objects 106 located at different locations, the same principle of the radar returns having different velocity values dependent upon their azimuth angle relative to the moving radar system applies to moving objects 108 shown in FIG. 1 as well. In other words, a moving object 108 directly in front of the moving radar system 102 (e.g., at a front point as shown in FIG. 5) will have a different Doppler velocity in the radar return than a moving object 108 having the same actual velocity but at a side point as shown in FIG. 3.

Figure 4:
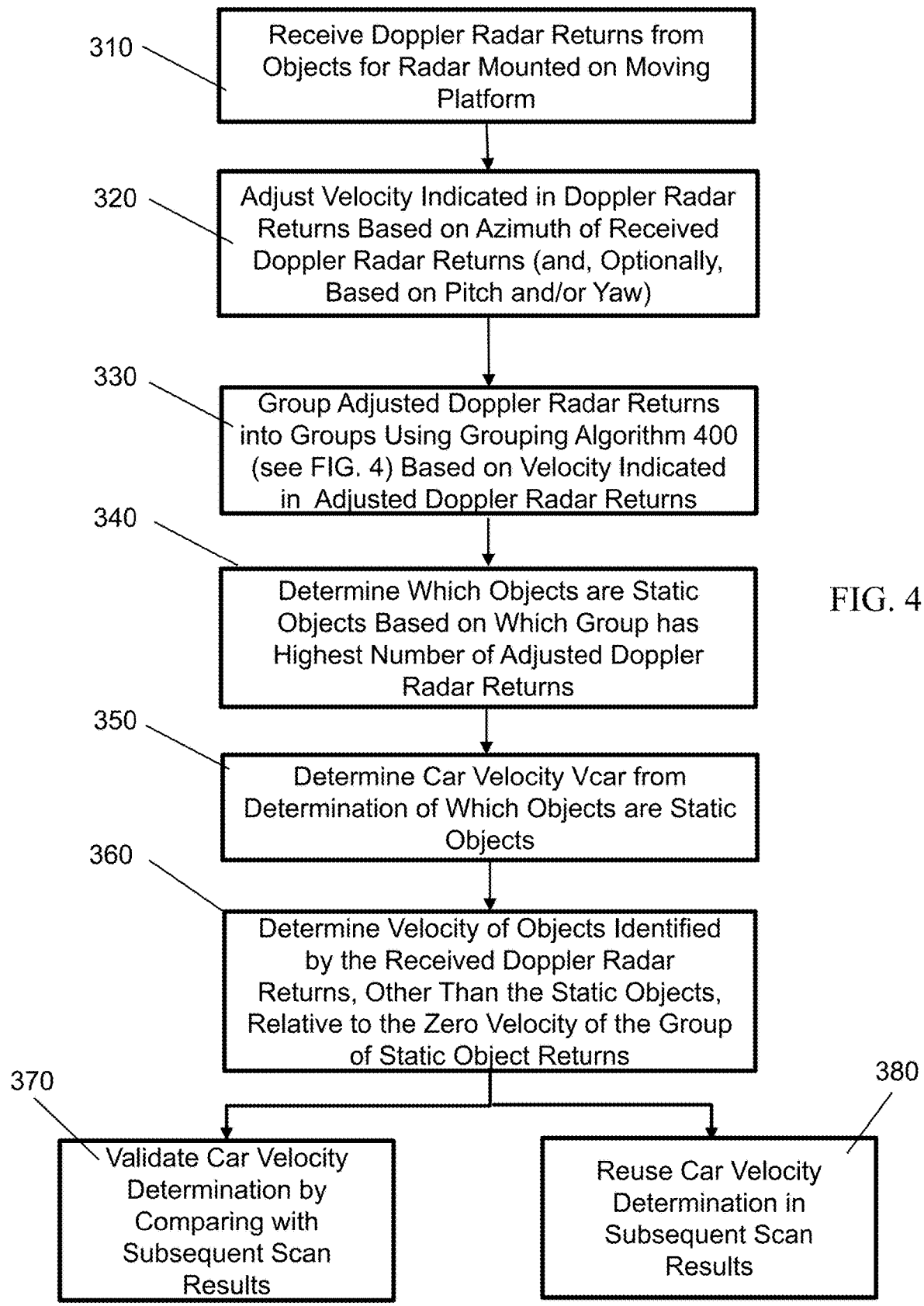
FIG. 4 show a flow diagram of operations of a system for segmentation of static and dynamic objects for a moving radar system, in accordance with aspects of the present disclosure.

FIG. 4 shows a flow diagram of operations of a system for segmentation of static and dynamic objects based on radar returns received from the static objects 106 and the moving objects 108 in response to the radar signals 110 and 112, respectively, from the moving radar system 102 shown in FIGS. 1 and 2. Specifically, in step 310, radar returns from both static objects 106 and moving objects 108 are received in response to radar scans of transmitted radar signals 110 and 112 from the radar system 102. In step 320, a velocity indicated in each of the radar returns is adjusted based on an azimuth of each of the received radar returns to generate a set of adjusted radar returns. For example, the Doppler velocity of d2=−7 m/s shown in FIG. 5 will be adjusted using the formula Adjusted Car Speed (Vcar)=−Doppler÷cos(ϕ) to adjust the Doppler velocity for the static object 106 at the side point shown in FIG. 5 to be −10 m/s (corresponding to the negative equivalent of the actual positive moving speed of the radar system 102 on the moving platform 104).

In accordance with another alternative implementation of the present disclosure, for radar systems 102 with high resolution in elevation the car speed formula can be extended with θ angle (pitch) additionally to ϕ angle (azimuth or yaw) using the adjustment equation:

Adjusted Car Speed(Vcar)=−Doppler÷cos(ϕ)÷cos(θ)

In addition to making adjustments based on the azimuth of each return, in another alternative implementation of the present disclosure, adjustments of the radar returns from each object can also be made based on yaw and/or pitch of the radar system 102 on the moving platform 104. More specifically, the equations discussed above for making adjustments based on the azimuth of the radar returns are deduced for the case when the radar system 102 is facing forward and the radar yaw angle and the radar pitch angle are both)°. If the radar system 102 is placed on a moving platform 104, for example a car or a robot, with some radar yaw angle 130 and/or pitch angle (not shown) other than 0°, then these angles can be added to the above equation for car speed. In other words, taking the radar yaw angle 130 (and radar pitch angle, if it exists) into account, the azimuth angle ϕ in the equation below is the point azimuth angle 132 of FIG. 2, and the combined angles ϕ+ϕr corresponds to the total azimuth angle 134 of the object 106 relative to a reference direction 120 shown in FIG. 2. The calibration of the radar yaw angle 130 (e.g., ϕr) will be discussed below with regard to FIG. 7. Assuming, for purposes of example, that the moving platform 104 is a car, the adjusted car speed can be calculated using the equation:

Adjusted Car Speed(Vcar)=−Doppler÷cos(ϕ+ϕr)÷cos(θ+θr)

where ϕr—radar yaw angle 130
θr—radar pitch angle

It is also important to handle edge cases when the result of either of the above cosine functions in the equations for adjusting car speed based on a combination of azimuth of the radar returns, yaw and/or pitch becomes 0. That would produce division by zero. While front facing radar with less than 180 degrees view angle will never create such a situation, side radars can have this issue. That can happen, for example, for points that have an angle sum equal to 90 degrees. These points lay on a line that is perpendicular to the car side and draw from the radar center, and, therefore, can be safely excluded from the calculation of adjusted car speed using the above formulas based on yaw and/or pitch of the car. For the three dimensional (3D) case this line becomes a plane.

Still referring to FIG. 4, in step 330 the adjusted radar returns from step 320 are grouped into a plurality of groups using a grouping algorithm 400 (that will be discussed below with reference to FIG. 5) based on the velocity indicated in each of the adjusted radar returns. Each of the groups has a predetermined minimum velocity value Vmin, a predetermined maximum velocity value Vmax, and a predetermined threshold velocity difference value between Vmin and Vmax. In step 340, it is determined which of the objects are static objects based on determining which group of the plurality of groups has the highest number of adjusted radar returns. This will be discussed in further detail below with reference to FIGS. 4 and 5.

Next, in step 350, once the determination has been made as to which objects are static objects, platform velocity of the moving platform 104 (and, of course, the radar system 102 mounted thereon) is determined from the determination of which objects are static objects. This determination of platform velocity is based on setting velocity for the group of static objects 106 determined in step 340 to be zero velocity and determining the platform velocity relative to the zero velocity of the static objects 106. In step 360 velocity of the moving objects 108 identified by the received (and adjusted) radar returns, other than the returns from the static objects 108, is determined relative to the zero velocity that has been set for the group of static object returns identified in step 340.

Still referring to FIG. 4, in step 370, once the platform velocity has been determined in step 350, verification of this determination can be performed by comparing the determination with the determination of platform velocity in a subsequent radar scan (e.g., a subsequent transmission of the radar signals 110 and 112, and reception of radar returns from these subsequent transmissions). Further, in step 380, the determined platform velocity can be reused, if desired, in calculations from subsequent radar scans.

FIG. 5 is a flow diagram showing operations for a grouping algorithm 400, in accordance with the aspects of the present disclosure. In step 410 a group array of speed groups (which can be continuous adjoining speed groups, if desired) is created, with each speed group having a minimum adjusted Doppler velocity Vmin, a maximum adjusted Doppler velocity Vmax, and a step threshold Vthreshold between Vmin and Vmax. A point counter is provided for each of the speed groups which counts a list of points that are assigned to each speed group based on the adjusted Doppler velocities for each of the detected objects in a radar scan (comprised of all of the returns received from objects for transmission of a plurality of radar signals 110 and 112 in one radar scan). If the speed groups are continuous, the Vmax for one group will be the Vmin for the adjacent higher speed group.

Decision step 420 is conducted for each point of a given radar scan (e.g., each "point" being an analysis of each of the adjusted radar returns for a given radar scan, which normally will include a large number of radar returns, each return corresponding to a reflection of the transmitted radar signals of the radar scan from a given static or moving object). This decision step 420 will determine whether all of the points in a given radar scan have already been analyzed and placed into the appropriate speed group, or whether there are still more points in the radar scan to analyze. If the result of the decision step 420 is that more points from the radar scan need to be analyzed, then the analysis proceeds to determine which of the speed groups the next point (e.g., the adjusted Doppler velocity from a given object) should be placed into. This determination of which speed group to place the point into is performed with steps 430, 440 and 450 shown in FIG. 5.

Still referring to FIG. 5, in step 430 the adjusted car speed Vcar is calculated for the next point p in the returns from the radar scan using the formula noted above of Adjusted Car Speed (Vcar)=−Doppler÷cos(φ). In step 440, a group index i is determined for one of the speed groups as i=(Vcar−Vmin)/Vthreshold into which the adjusted Doppler velocity Vcar falls. Next, in step 450, a point p is added to the point list of the found group i for the given adjusted Doppler velocity Vcar, and the point counter for this found group is incremented. After step 450, the process returns to decision step 420 to determine if any more points need to be analyzed. When all of the points for a given radar scan have been analyzed, the decision step 420 will proceed to step 460 to determine which of the plurality of speed groups has the most points in its point counter, and to mark the points in the point list for this group as static objects (as per step 340 in FIG. 5).

Figure 6:
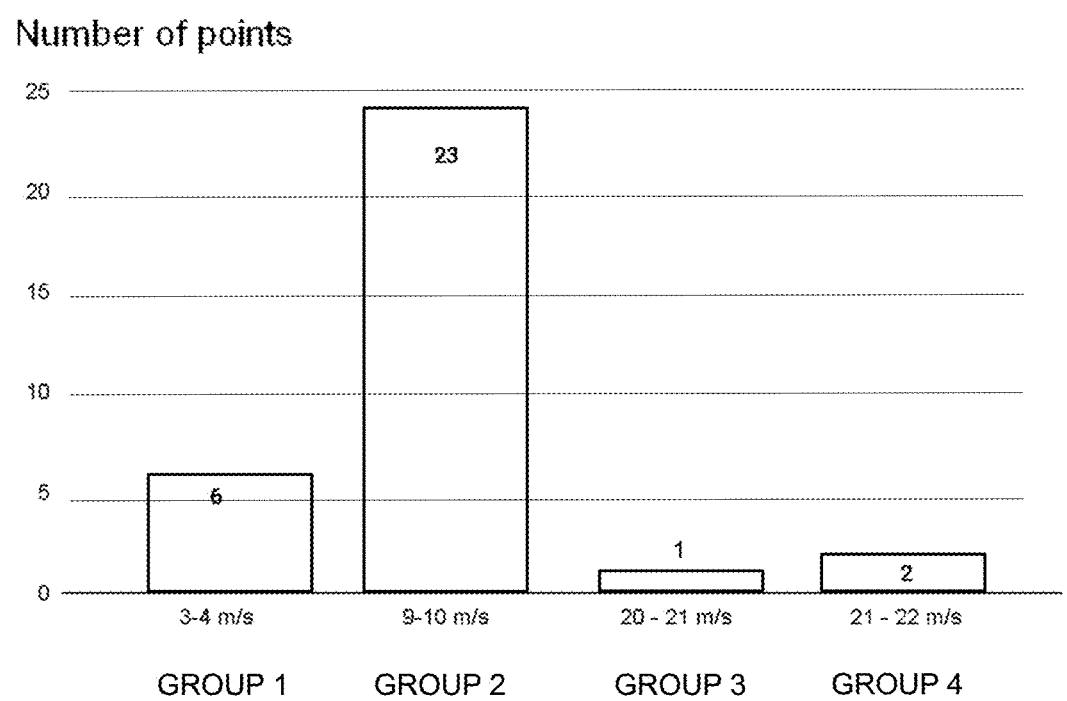
FIG. 6 is a bar graph showing results of grouping radar returns from a moving radar system to determine which radar returns are from static objects, in accordance with the aspects of the present disclosure.

FIG. 6 is a bar graph (histogram) showing results of grouping radar returns from a moving radar system 102 to determine which radar returns are from static objects 106 using the grouping algorithm 400 discussed above with regard to FIG. 5. For example, this histogram shown in FIG. 6 includes: Group 1 with 6 points (e.g., adjusted radar returns) that have an adjusted calculated car speed within 3 to 4 m/s; Group 2 with 23 points for a 9-10 m/s speed range; Group 3 with 1 point in the 20-21 m/s range; and Group 4 with 2 points in the 21-22 m/s range. Group 2 has the maximum number of points with 23 points, which is many more points than any of the other groups. Since it is known that there are many more static objects 106 in the environment of a car (or robot, or any other vehicle that moves on or close to the ground), this means all points in Group 2 that have calculated speed v>9 and v<10 are static objects 106. As such, use of the grouping algorithm 400 of FIG. 5 provides a highly accurate and convenient approach to achieve segmentation between static and dynamic objects using returns from a moving radar system.

In the specific example of FIG. 6, Vthreshold between Vmin and Vmax for each of the four illustrated groups is 1 m/s. It is noted, of course, that the specific groups shown in FIG. 6 are solely for purposes of non-limiting example, and any Vthreshold and any desired number of groups could be used. Further, the groups can be set to cover a large continuous range of velocities, or there can be gaps between the velocities covered by the groups. In other words, as shown in FIG. 6, a gap exists between Group 1 and Group 2 such that objects which have an adjusted car speed between 4 m/s and 9 m/s are not shown. However, in many instances, it is preferred to cover a continuous range of adjusted velocities by having the Vmax for a lower velocity group be the same as the Vmin for the next faster velocity group (e.g., as shown by the relationship between Group 3 and Group 4 in FIG. 6, where Vmax for Group 3 is 21 m/s and Vmin for Group 4 is 21 m/s). For example, as an alternative to the case shown in FIG. 6, there could be twenty-two speed groups, each with a Vthreshold of 1 m/s between 0 m/s and 22 m/s.

As described above with reference to steps 350 and 360 of FIG. 5, once it is determined which objects are static using the grouping algorithm 400, one can easily determine car speed of the car that the moving radar system 102 is mounted, and the speed of other nearby moving objects (e.g., other cars, trucks, etc., in the vicinity) by simply calculating an average for all car speeds from the static points speed group (e.g., Group 2 in the specific example of FIG. 6). Calculated car speed for the car which the radar system 102 is mounted on can be used to validate if static points are properly found in future scans in case those future scans may, for example, have more dynamic points or any error happens. Car speed for the car the radar is mounted on cannot change significantly between two radar scans, so it is possible to validate results by comparing the calculated car speed between successive scans, as shown in step 370 of FIG. 5.

One can also re-use previous calculated car speed of the car the radar system 102 is mounted on to find static points in the next scan(s), as shown in step 380 in FIG. 5. It is also possible to add logic to cover any other cases that are important for a given radar system. An addition benefit of the system and method described in the present disclosure is that it is possible to validate/correct car speed and segmentation processing by using alpha, beta or Kalman filters. In addition, determined car speed using the system and method of the present disclosure can be compared with GPS, odometer or other sensors reporting speed for extra validation, or can used in conjunction with any other processing in other systems mounted on the vehicle to validate determined results from other systems or to assist in calculations be preformed in such other systems.

Figure 7:
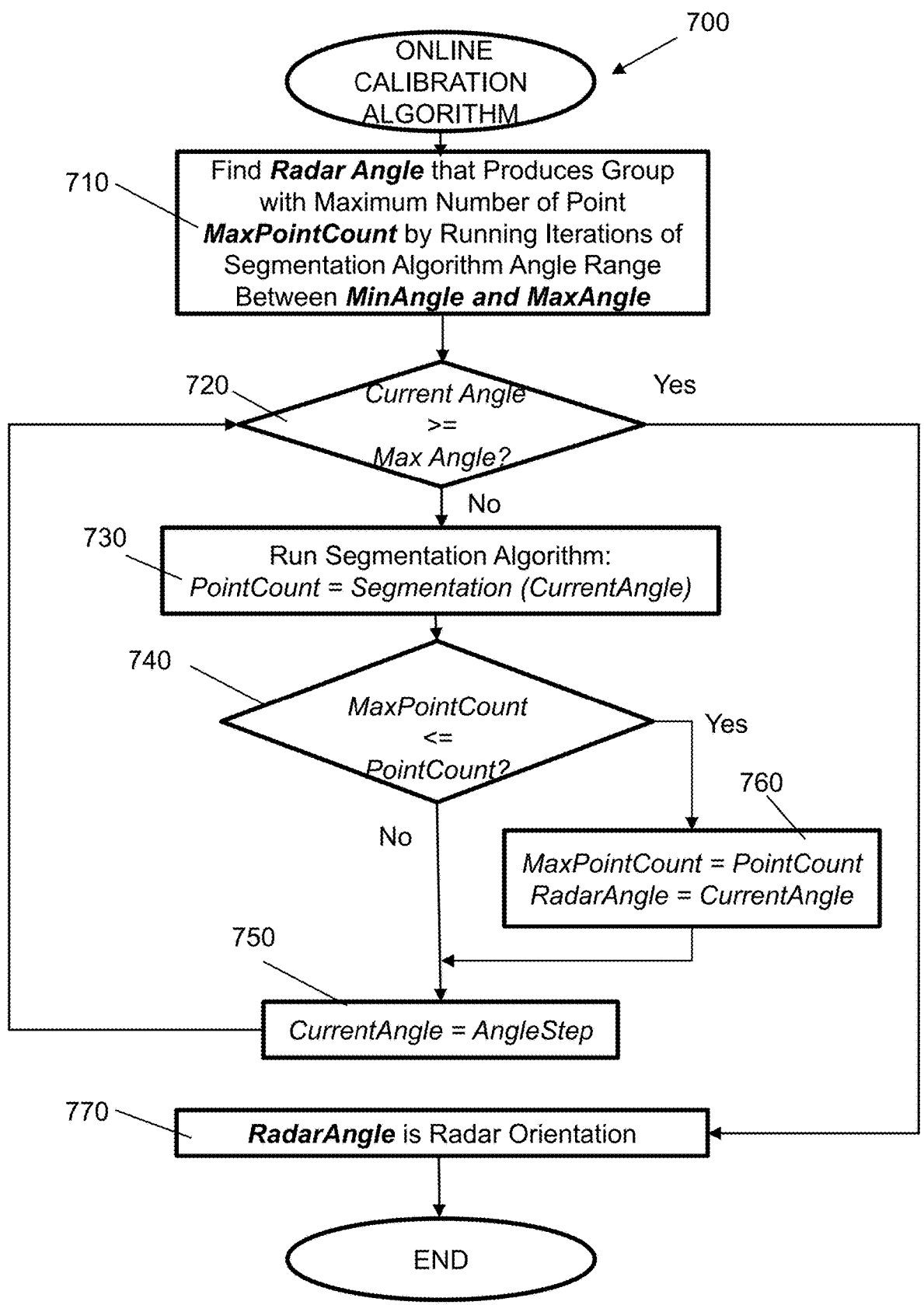
FIG. 7 shows a flow diagram of operations of a system and method that uses the segmentation algorithm described with regard to FIGS. 3-6 to calibrate the radar yaw angle of the radar system while the radar system is mounted on a moving platform in accordance with aspects of the present disclosure.

FIG. 7 shows a flow diagram of operations of a system and method that uses the segmentation algorithm described above with regard to FIGS. 3-6 to calibrate the radar yaw angle of the radar system while the radar system is mounted on a moving platform in accordance with aspects of the present disclosure. In this regard, the operations shown in FIG. 7 pertain to running the segmentation algorithm, as shown in step 710, by iterating through a range of possible radar yaw angles to find the "RadarAngle" that produces a group with a maximum number of points "MaxPointCount"

by running iterations of the segmentation algorithm over an angle range between a "MinAngle" and "MaxAngle." This range can be a group of possible estimated radar yaw angles covering an entire range from 0 to 359 degrees. Alternatively, the range of estimated radar yaw angles can be some specific narrower range, for example, if an approximate radar position is already known (e.g., front facing radar). The iteration steps for iterating repetition of the segmentation algorithm between the MinAngle and the MaxAngle can be selected based on the radar resolution. For example, the iteration steps can be approximately 1° each for a radar system with a fine degree of radar resolution. Alternatively, other desired iteration steps could be used, such as 5°, 10°, etc., either due to a courser degree of radar resolution or to speed up the calibration process by running fewer iterations.

Still referring to FIG. 7, to implement step 710, steps 720 to 770 show the actual iteration process of running the segmentation algorithm between the MinAngle and the MaxAngle to determine a "RadarAngle" that corresponds to the correct (calibrated) radar yaw angle. To this end, step 720 determines whether the current angle being considered for an iteration of the segmentation algorithm is greater than or equal to the MaxAngle. If the determination in step 720 is "Yes," then the iterations of the segmentation algorithm is complete, and the RadarAngle which has the highest number of points (e.g., PointCount), for all of the iterations of the segmentation algorithm that have been completed, for the Group corresponding to the static objects (e.g., such as Group 2 shown in FIG. 6) will be the correct (calibrated) radar orientation (i.e., the actual correct radar yaw angle), as shown in step 770. On the other hand, if the determination in step 720 is "No," then another iteration is performed of the segmentation algorithm (step 730). In other words, in step 730, another iteration of the segmentation algorithm discussed above with reference to FIGS. 3-6 will be performed. This iteration produces a PointCount corresponding to the points in the group (such as Group 2 in FIG. 6) which corresponds to the static objects, as determined for the calculation of the segmentation algorithm for the CurrentAngle (e.g., the current estimated radar yaw angle) being used for the calculations for the currently run iteration of the segmentation algorithm. In other words, for each iteration of the segmentation algorithm for a given one of the estimated radar yaw angles in the group of estimated yaw angles (between the MinAngle and the MaxAngle), a PointCount will be produced corresponding to the determination of a group of return returns corresponding to the static objects.

In step 740, it is determined whether the PointCount that has just been determined for the particular iteration of the segmentation algorithm is less than or equal to the most recently determined MaxPointCount from previous iterations. If the determination in step 740 is "Yes" that the current PointCount is greater than or equal to the previously determined MaxPointCount, then, as shown in step 750, the CurrentAngle (i.e., the estimated radar yaw angle used for the particular iteration being performed) is selected to be the current RadarAngle (i.e., the angle having the largest PointCount corresponding to the group of radar returns indicating which objects are static). In other words, the CurrentAngle is determined, for the time being, as the correct (calibrated) radar yaw angle, subject to further iterations that might or might not yield a more accurate result. On the other hand, if the result of the determination in step 740 is "No," then, as shown in step 760, an AngleStep (i.e., the next iteration) is performed for the CurrentAngle to add the angle of iteration to the CurrentAngle to provide a new CurrentAngle to use in the next iteration of the segmentation algorithm.

With regard to the angles covered in the range between MinAngle and MaxAngle, instead of using a naive search (e.g., a search without any predeterminations of what the angle range might be) one can use AI/DL (Artificial Intelligence/Deep Learning) techniques, or any other deterministic approach, to find an appropriate smaller range of possible yaw angles to allow determination of the actual correct RadarAngle, as discussed above with reference to FIG. 7, with much less computational burden and/or much faster.

In accordance with alternative implementations, it is possible to increase calibration accuracy by evaluating the radar position (i.e., the calibrated radar yaw angle) for multiple scans and then using the information obtained to eliminate possible noise, errors or discrepancies. In other words, after a first calibrated radar yaw angle has been determined for one radar scan using the techniques described above with regard to FIG. 7, one or more additional calibrated radar yaw angles can be determined by repeating the steps of FIG. 7 for subsequent radar scans. In particular, these benefits can be obtained by calculating mean angle value and/or removing less frequent values that are too different from the mean. Also, RNN algorithms or tracking methods can be utilized for improving accuracy.

In other implementations, radar angles other than radar yaw angles can be evaluated by adding such other radar angles to the segmentation algorithm calculations. For example, a 3D case formula can be used to evaluate not only the radar yaw $\phi_r$ calibration, but also the radar pitch angle $\theta_r$. This can be done using the segmentation algorithm:

Car Speed=−Doppler÷cos($\phi$+$\phi_r$)÷cos($\theta$+$\theta_r$)

It is noted that one possible issue with evaluating multiple angles using a segmentation algorithm, as discussed above, is that it might result in more than one group that have the same number of maximum points for the static objects. If this is the case, then there could be more than one set of resulting angles as possible calibrated yaw angles. To eliminate this possible problem, the number of scans that are being used for the calibration can be increased, as discussed above, to eliminate the false indications of the calibrated radar yaw angle, or RNN (Recurrent Neural Networks) methods can be used to determine which of the several possible calibrated radar yaw angles is, in fact, the correct calibrated radar yaw angle.

Figure 8:
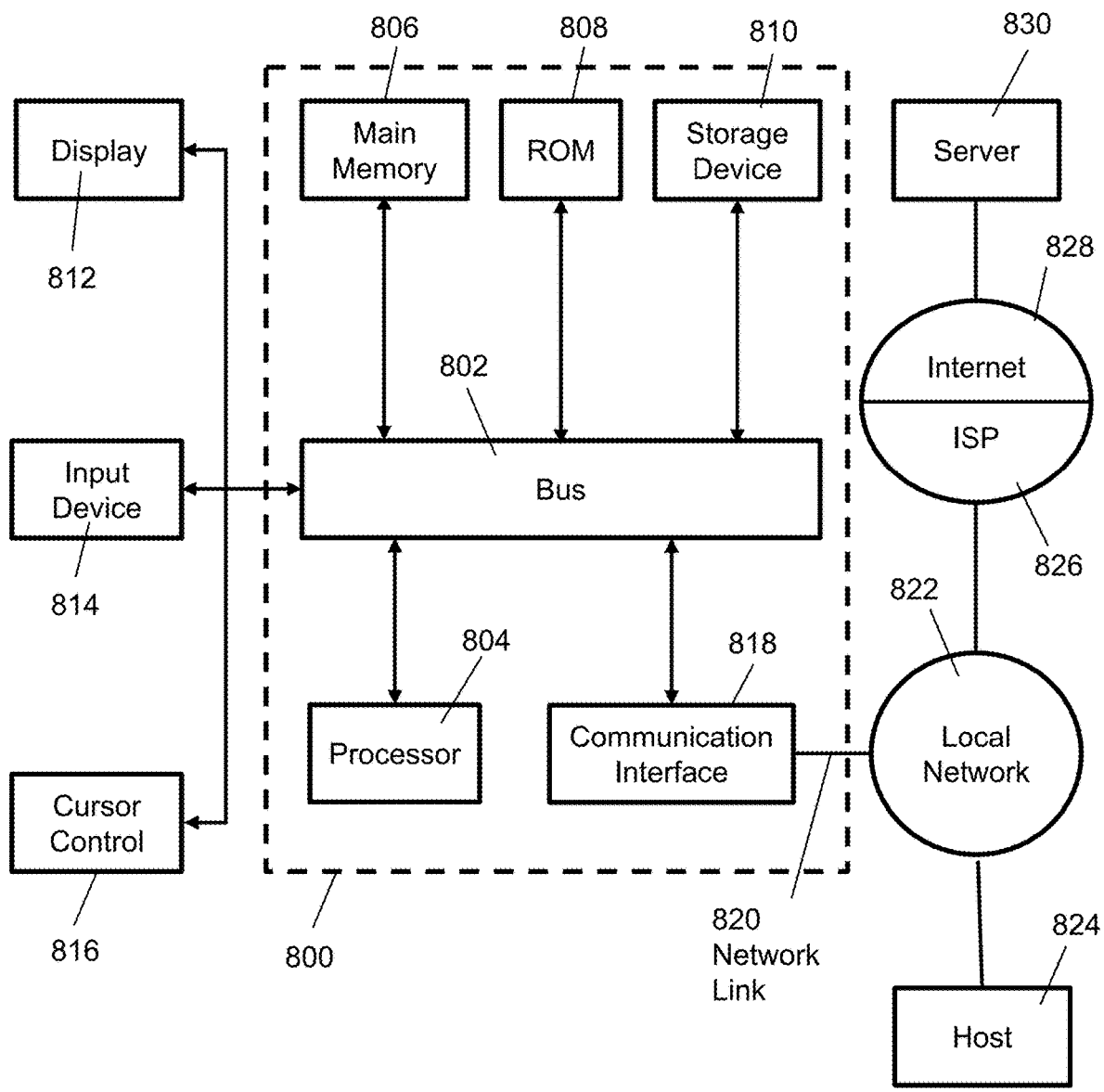
FIG. 8 is a block diagram showing an example computer system upon which aspects of this disclosure may be implemented.

FIG. 8 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, an on-board computer in the radar system 102 for running an application to carry out the processing shown in FIGS. 3-5, or, alternatively, a computer in a server in a cloud-based system to receive the radar returns from the radar system 102 to carry out the above-discussed signal processing.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, and a cursor control 816 for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

In the following, further features, characteristics and advantages of the invention will be described by means of items:

Item 1. A system including one or more processors and one or more machine-readable media storing instructions which, when executed by the one or more processors, cause the one or more processors to receive radar returns from objects in response to a first radar scan comprised of a plurality of transmitted radar signals from the radar system, wherein the radar returns include Doppler shift, run a segmentation algorithm a plurality of times on the received radar returns from the first radar scan, using a different preset estimated radar yaw angle for each iteration of running of the segmentation algorithm, from a group of preset estimated radar yaw angles, wherein the estimated radar yaw angles are for estimated directions of transmission of the radar signals along a radar boresight from the transmitter of the radar system relative to a predetermined direction for each run of the segmentation algorithm, to determine which of the objects are static objects using the segmentation algorithm, and determine a first calibrated radar yaw angle as one of the preset estimated radar yaw angles which, among the different preset estimated radar yaw angles, has a highest number of adjusted radar returns for objects determined to be static objects by the segmentation algorithm.

Item 2. The system of item 1, wherein the group of preset estimated radar yaw angles extends from a preset minimum yaw angle to a preset maximum radar yaw angle, and wherein a preset iteration step angle for each estimated radar yaw angle is set for iterations of the segmentation algorithm between the preset minimum yaw angle to the preset maximum radar yaw angle.

Item 3. The system of items 1 or 2, wherein the preset minimum yaw angle is 0°, and the preset maximum yaw angle is 359°.

Item 4. The system of any of items 1-3, wherein the preset iteration step angle is between 1°-10°.

Item 5. The system of any of items 1-4, wherein an initial preset estimated radar yaw angle for a first run of the segmentation algorithm is provided by a predetermined deterministic approach.

Item 6. The system of any of items 1-5, wherein the predetermined deterministic approach is an artificial intelligence technique.

Item 7. The system of any of items 1-6, wherein the radar yaw angle is an angle between the direction of transmission of the radar signal along the radar boresight from the transmitter of the radar system and a location of a predetermined coordinate of an inertial measurement unit (IMU) located on the moving platform adjacent to the transmitter of the radar system or along a heading angle of the moving platform.

Item 8. The system of any of items 1-7, wherein the one or more machine-readable media store instructions which, when executed by the one or more processors, cause the one or more processors to include a plurality of estimated radar pitch angles in the determination of which objects are static objects.

Item 9. The system of any of items 1-8, wherein the one or more machine-readable media store instructions which, when executed by the one or more processors, cause the one or more processors to receive second radar returns from a second radar scan of the objects, run the segmentation algorithm a plurality of times to determine a second calibrated radar yaw angle for the second radar returns from the second radar scan of the objects, and determine a mean calibrated radar yaw angle from the first calibrated radar yaw angle and the second calibrated radar yaw angle.

Item 10. The system of any of items 1-9, wherein the predetermined direction is the direction of travel of the vehicle.

Item 11. A method including receiving radar returns from objects in response to a first radar scan comprised of a plurality of transmitted radar signals from a radar system including a transmitter and a receiver mounted on a moving platform, wherein the radar returns include Doppler shift, running a segmentation algorithm a plurality of times on the received radar returns from the first radar scan, using a different preset estimated radar yaw angle for each iteration of running of the segmentation algorithm, from a group of preset estimated radar yaw angles, wherein the estimated radar yaw angles are for estimated directions of transmission of the radar signals along a radar boresight from the transmitter of the radar system relative to a predetermined direction for each run of the segmentation algorithm, to determine which of the objects are static objects using the segmentation algorithm, and determining a first calibrated radar yaw angle as one of the preset estimated radar yaw angles which, among the different preset estimated radar yaw angles, has a highest number of adjusted radar returns for objects determined to be static objects by the segmentation algorithm.

Item 12. The method of item 11, wherein the group of preset estimated radar yaw angles extends from a preset minimum yaw angle to a preset maximum radar yaw angle, and wherein a preset iteration step angle for each estimated radar yaw angle is set for iterations of the segmentation algorithm between the preset minimum yaw angle to the preset maximum radar yaw angle.

Item 13. The method of items 11 or 12, wherein the preset minimum yaw angle is 0°, and the preset maximum yaw angle is 359°.

Item 14. A method any of items 10-13 wherein the preset iteration step angle is between 1°-10°.

Item 15. The method of any of items 10-14, wherein an initial preset estimated radar yaw angle for a first run of the segmentation algorithm is provided by a predetermined deterministic approach.

Item 16. The method of any of items 10-15, wherein the predetermined deterministic approach is an artificial intelligence technique.

Item 17. The method of any one of items 10-16, wherein the radar yaw angle is an angle between the direction of transmission of the radar signal along the radar boresight from the transmitter of the radar system and a location of a predetermined coordinate of an inertial measurement unit (IMU) located on the moving platform adjacent to the transmitter of the radar system or along a heading angle of the moving platform.

Item 18. The method of any one of items 13-17, further comprising including a plurality of estimated radar pitch angles in the determination of which objects are static objects.

Item 19. The method of any one of items 13-18, further including receiving second radar returns from a second radar scan of the objects, running the segmentation algorithm a plurality of times to determine a second calibrated radar yaw angle for the second radar returns from the second radar scan of the objects, and determining a mean calibrated radar yaw angle from the first calibrated radar yaw angle and the second calibrated radar yaw angle.

Item 20. The method of any one of items 13-19, wherein the predetermined direction is the direction of travel of the vehicle.

Item 21. A system including one or more processors and one or more machine-readable media storing instructions which, when executed by the one or more processors, cause the one or more processors to receive radar returns from objects in response to radar scans of transmitted radar signals from the radar system, wherein the radar returns include Doppler shift, adjust a velocity indicated in each of the radar returns based on an azimuth of each of the received radar returns to generate a set of adjusted radar returns, perform a first iteration of a segmentation algorithm using a first estimated radar yaw angle to group the adjusted radar returns into a plurality of groups based on the velocity indicated in each of the adjusted radar returns, each of the groups having predetermined minimum velocity value Vmin, a predetermined maximum velocity value Vmax, and a predetermined threshold velocity difference value between Vmin and Vmax, and determine which of the objects are static objects based on determining which group of the plurality of groups has highest number of adjusted radar returns, repeat the segmentation algorithm a plurality of times on the received radar returns from the first radar scan, using a different preset estimated radar yaw angle for each iteration of running of the segmentation algorithm, from a group of preset estimated radar yaw angles, wherein the estimated radar yaw angles are for estimated directions of transmission of the radar signals along a radar boresight from the transmitter of the radar system relative to a predetermined direction for each run of the segmentation algorithm, to repeatedly determine which of the objects are static objects using the segmentation algorithm, and determine a first calibrated radar yaw angle as one of the preset estimated radar yaw angles which, among the different preset estimated radar yaw angles, has a highest number of adjusted radar returns for objects determined to be static objects by the segmentation algorithm.

Item 22. The system of item 21 wherein the group of preset estimated radar yaw angles extends from a preset minimum yaw angle to a preset maximum radar yaw angle, and wherein a preset iteration step angle for each estimated radar yaw angle is set for iterations of the segmentation algorithm between the preset minimum yaw angle to the preset maximum radar yaw angle.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising:
   one or more processors coupled to receive signals from a radar system including a transmitter and a receiver mounted on a moving platform; and
   one or more machine-readable media storing instructions which, when executed by the one or more processors, cause the one or more processors to:
   receive radar returns from objects in response to a first radar scan comprised of a plurality of transmitted radar signals from the radar system, wherein the radar returns include Doppler shift;
   run a segmentation algorithm a plurality of times on the received radar returns from the first radar scan, using a different preset estimated radar yaw angle for each iteration of running of the segmentation algorithm, from a group of preset estimated radar yaw angles, wherein the estimated radar yaw angles are for estimated directions of transmission of the radar signals along a radar boresight from the transmitter of the radar system relative to a predetermined direction for each run of the segmentation algorithm, to determine which of the objects are static objects using the segmentation algorithm, wherein the segmentation algorithm comprises:
   adjusting a velocity indicated in each of the radar returns based on an azimuth of each of the received radar returns to generate a set of adjusted Doppler radar returns;
   after generating the set of adjusted Doppler radar returns, grouping the set of adjusted Doppler radar returns into a histogram having a plurality of groups based on the velocity indicated in each of the adjusted Doppler radar returns, each of the groups of the histogram having a predetermined minimum velocity value Vmin, a predetermined maximum velocity value Vmax, and a predetermined threshold velocity difference value between Vmin and Vmax; and
   determining which of the objects are static objects based on determining which group of the plurality of groups in the histogram has a highest number of adjusted Doppler radar returns; and
   determine a first calibrated radar yaw angle as one of the preset estimated radar yaw angles which, among the different preset estimated radar yaw angles, has a highest number of adjusted radar returns for objects determined to be static objects by the segmentation algorithm.

2. The system of claim 1, wherein the group of preset estimated radar yaw angles extends from a preset minimum yaw angle to a preset maximum radar yaw angle, and wherein a preset iteration step angle for each estimated radar yaw angle is set for iterations of the segmentation algorithm between the preset minimum yaw angle to the preset maximum radar yaw angle.

3. The system of claim 2, wherein the preset minimum yaw angle is 0°, and the preset maximum yaw angle is 359°.

4. The system of claim 3, wherein the preset iteration step angle is between 1°-10°.

5. The system of claim 2, wherein an initial preset estimated radar yaw angle for a first run of the segmentation algorithm is provided by a predetermined deterministic approach.

6. The system of claim 5, wherein the predetermined deterministic approach is an artificial intelligence technique.

7. The system of claim 2, wherein the radar yaw angle is an angle between the direction of transmission of the radar signal along the radar boresight from the transmitter of the radar system and a location of a predetermined coordinate of an inertial measurement unit (IMU) located on the moving platform adjacent to the transmitter of the radar system or along a heading angle of the moving platform.

8. The system of claim 1, wherein the one or more machine-readable media store instructions which, when executed by the one or more processors, cause the one or more processors to include a plurality of estimated radar pitch angles in the determination of which objects are static objects.

9. The system of claim 1, wherein the one or more machine-readable media store instructions which, when executed by the one or more processors, cause the one or more processors to:
   receive second radar returns from a second radar scan of the objects;
   run the segmentation algorithm a plurality of times to determine a second calibrated radar yaw angle for the second radar returns from the second radar scan of the objects; and
   determine a mean calibrated radar yaw angle from the first calibrated radar yaw angle and the second calibrated radar yaw angle.

10. The system of claim 1 wherein the predetermined direction is the direction of travel of a vehicle which the moving platform is mounted on.

11. A method comprising:
receiving radar returns from objects in response to a first radar scan comprised of a plurality of transmitted radar signals from a radar system including a transmitter and a receiver mounted on a moving platform, wherein the radar returns include Doppler shift;
running a segmentation algorithm a plurality of times on the received radar returns from the first radar scan, using a different preset estimated radar yaw angle for each iteration of running of the segmentation algorithm, from a group of preset estimated radar yaw angles, wherein the estimated radar yaw angles are for estimated directions of transmission of the radar signals along a radar boresight from the transmitter of the radar system relative to a predetermined direction for each run of the segmentation algorithm, to determine which of the objects are static objects using the segmentation algorithm, wherein the segmentation algorithm comprises:
adjusting a velocity indicated in each of the radar returns based on an azimuth of each of the received radar returns to generate a set of adjusted Doppler radar returns;
after generating the set of adjusted Doppler radar returns, grouping the set of adjusted Doppler radar returns into a histogram having a plurality of groups based on the velocity indicated in each of the adjusted Doppler radar returns, each of the groups of the histogram having a predetermined minimum velocity value Vmin, a predetermined maximum velocity value Vmax, and a predetermined threshold velocity difference value between Vmin and Vmax; and
determining which of the objects are static objects based on determining which group of the plurality of groups in the histogram has a highest number of adjusted Doppler radar returns; and
determining a first calibrated radar yaw angle as one of the preset estimated radar yaw angles which, among the different preset estimated radar yaw angles, has a highest number of adjusted radar returns for objects determined to be static objects by the segmentation algorithm.

12. The method of claim 11, wherein the group of preset estimated radar yaw angles extends from a preset minimum yaw angle to a preset maximum radar yaw angle, and wherein a preset iteration step angle for each estimated radar yaw angle is set for iterations of the segmentation algorithm between the preset minimum yaw angle to the preset maximum radar yaw angle.

13. The method of claim 12, wherein the preset minimum yaw angle is 0°, and the preset maximum yaw angle is 359°.

14. The method of claim 12, wherein the preset iteration step angle is between 1°-10°.

15. The method of claim 12, wherein an initial preset estimated radar yaw angle for a first run of the segmentation algorithm is provided by a predetermined deterministic approach.

16. The method of claim 15, wherein the predetermined deterministic approach is an artificial intelligence technique.

17. The method of claim 12, wherein the radar yaw angle is an angle between the direction of transmission of the radar signal along the radar boresight from the transmitter of the radar system and a location of a predetermined coordinate of an inertial measurement unit (IMU) located on the moving platform adjacent to the transmitter of the radar system or along a heading angle of the moving platform.

18. The method of claim 11, further comprising including a plurality of estimated radar pitch angles in the determination of which objects are static objects.

19. The method of claim 11, further comprising:
receiving second radar returns from a second radar scan of the objects;
running the segmentation algorithm a plurality of times to determine a second calibrated radar yaw angle for the second radar returns from the second radar scan of the objects; and
determining a mean calibrated radar yaw angle from the first calibrated radar yaw angle and the second calibrated radar yaw angle.

20. The method of claim 11, wherein the predetermined direction is the direction of travel of a vehicle which the moving platform is mounted on.

21. A system comprising:
one or more processors coupled to receive signals from a radar system including a transmitter and a receiver mounted on a moving platform; and
one or more machine-readable media storing instructions which, when executed by the one or more processors, cause the one or more processors to:
receive radar returns from objects in response to radar scans of transmitted radar signals from the radar system, wherein the radar returns include Doppler shift;
adjust a velocity indicated in each of the radar returns based on an azimuth of each of the received radar returns to generate a set of adjusted radar returns;
perform a first iteration of a segmentation algorithm using a first estimated radar yaw angle to:
adjust a velocity indicated in each of the radar returns based on an azimuth of each of the received radar returns to generate a set of adjusted Doppler radar returns;
after generating the set of adjusted Doppler radar returns, group the set of adjusted Doppler radar returns into a histogram having a plurality of groups based on the velocity indicated in each of the adjusted Doppler radar returns, each of the groups of the histogram having a predetermined minimum velocity value Vmin, a predetermined maximum velocity value Vmax, and a predetermined threshold velocity difference value between Vmin and Vmax; and
determine which of the objects are static objects based on determining which group of the plurality of groups in the histogram has a highest number of adjusted Doppler radar returns;
repeat the segmentation algorithm a plurality of times on the received radar returns from the first radar scan, using a different preset estimated radar yaw angle for each iteration of running of the segmentation algorithm, from a group of preset estimated radar yaw angles, wherein the estimated radar yaw angles are for estimated directions of transmission of the radar signals along a radar boresight from the transmitter of the radar system relative to a predetermined direction for each run of the segmentation algorithm, to repeatedly determine which of the objects are static objects using the segmentation algorithm; and determine a first calibrated radar yaw angle as one of the preset estimated radar yaw angles which, among the different preset estimated radar yaw angles, has a highest number of adjusted radar returns for objects determined to be static objects by the segmentation algorithm.

22. The system of claim 21, wherein the group of preset estimated radar yaw angles extends from a preset minimum yaw angle to a preset maximum radar yaw angle, and wherein a preset iteration step angle for each estimated radar yaw angle is set for iterations of the segmentation algorithm between the preset minimum yaw angle to the preset maximum radar yaw angle.

* * * * *